United States Patent [19]

Landay et al.

[11] 4,295,655

[45] Oct. 20, 1981

[54] ROLLER SKATING SHOE

[75] Inventors: David L. Landay, Brookline; Alvan H. Wolf, Worcester, both of Mass.

[73] Assignee: Brookfield Athletic Shoe Company, Inc., East Brookfield, Mass.

[21] Appl. No.: 40,093

[22] Filed: Jul. 18, 1979

[51] Int. Cl.³ .............................................. A63C 17/02
[52] U.S. Cl. ................................. 280/11.2; 280/11.28
[58] Field of Search ............... 280/11.27, 11.28, 11.19, 280/11.1, 11.2, 87.04 A

[56] References Cited

U.S. PATENT DOCUMENTS

| D. 143,983 | 2/1946 | Miller . | |
|---|---|---|---|
| D. 162,129 | 2/1951 | Coldwell . | |
| 116,161 | 6/1871 | Covell | 280/11.19 |
| 2,595,751 | 5/1952 | Balstad | 280/11.28 |
| 3,180,651 | 4/1965 | Ware | 280/11.2 |
| 3,306,623 | 2/1967 | Weitzner | 280/11.1 R X |
| 3,597,864 | 8/1971 | MacNeill | 36/67 D |
| 3,738,673 | 6/1973 | Iseman | 280/11.28 |
| 3,876,176 | 4/1975 | Morin | 249/96 |
| 4,058,323 | 11/1977 | Ware, Jr. | 280/11.28 X |
| 4,138,127 | 2/1979 | Kimmell et al. | 280/11.23 |
| 4,146,241 | 3/1979 | Stevenson | 280/11.27 |
| 4,180,278 | 12/1979 | Gottlieb | 280/87.04 A |

FOREIGN PATENT DOCUMENTS

| 815142 | 5/1974 | Belgium . |
| 2338942 | 11/1974 | Fed. Rep. of Germany . |
| 2013165 | 3/1970 | France . |
| 1590825 | 5/1970 | France . |

Primary Examiner—Joseph F. Peters, Jr.
Assistant Examiner—Michael Mar

[57] ABSTRACT

Rolling skating shoe with injection molded sole in which receptacles are provided that support the wheel hangers and wheels. The sole shown has a structural beam "T" profile, the flange of which supports the foot and the lower rib of which has an irregular lower edge forming a series of apertured angled bosses to receive the wheel hanger structure. Receptacles in the form of embedded threaded connectors enable bolting of the wheel hangers directly to the injected sole. The method for forming this shoe includes placing the threaded connectors into the mold and then injection molding the sole of semi-rigid plastic directly against a string lasted upper held in place by a last.

10 Claims, 9 Drawing Figures

ROLLER SKATING SHOE

INTRODUCTION AND BACKGROUND

This invention relates to roller skating shoes or boots, for instance rink skates which permit dancing and strenuous skating. In such skates a shoe or boot supporting the foot is secured to skate wheels of the roller bearing type. These wheels are permanently mounted below the plane of the sole of the shoe by hangers (trucks).

Prior roller skating shoes have employed fully formed shoes and boots which have been secured to a metal plate from which the wheel hangers and wheels have depended.

SUMMARY OF INVENTION

According to the invention a roller skating shoe is provided comprising a shoe upper, an injection molded sole of semi-rigid plastic material in the interior of which are receptacles into which skate wheel hangers are inserted and retained, the roller skate wheels being mounted on lower portions of these hangers.

In a preferred form the sole comprises an upper flange of an integral injection-molded structural beam that joins the two axles of the skate.

Preferably the receptacles include threaded connectors and the material of the injected sole is molded in permanent securing relationship about these threaded connectors, the wheel hangers being permanently bolted into these connectors. Preferably the threaded connectors comprise tubular portions that define threads and upper enlarged portions also embedded in the injection molded sole material for resisting pull-out. Preferably the connectors are one half inch long or longer.

In preferred embodiments: the injection molded sole in transverse cross section is of "T" beam profile, the cap or flange of the T defining the sole, extending over the width of the shoe, and the lower vertical portion of the T being relatively narrow, defining an integral longitudinal structural rib in which the receptacles are molded; the shoe is a string-lasted upper and the injection molded sole containing the receptacles is bonded directly to the margins of the string-lasted upper; the bottom of the sole is of irregular contour defining a series of angled bosses including a first set in which receptacles are molded for permanently joining the hangers to the sole and a second set receiving bracing struts of the hangers, preferably there also being a third, forwardmost boss mounting a toe stop; and the plastic from which the sole and integral structural rib are formed is of semi-rigid PVC or the like having hardness on the shore D scale of the order of 55.

Another aspect of the invention is a method of forming a roller skating shoe comprising injection molding a sole of beam profile to a roller skating shoe upper, providing in the mold cavity prior to injection a series of means defining receptacles aligned to receive and support structural elements of wheel hangers and thereafter permanently securing wheel hangers and wheels by use of these receptacles.

DESCRIPTION OF PREFERRED EMBODIMENT

Figure 1:
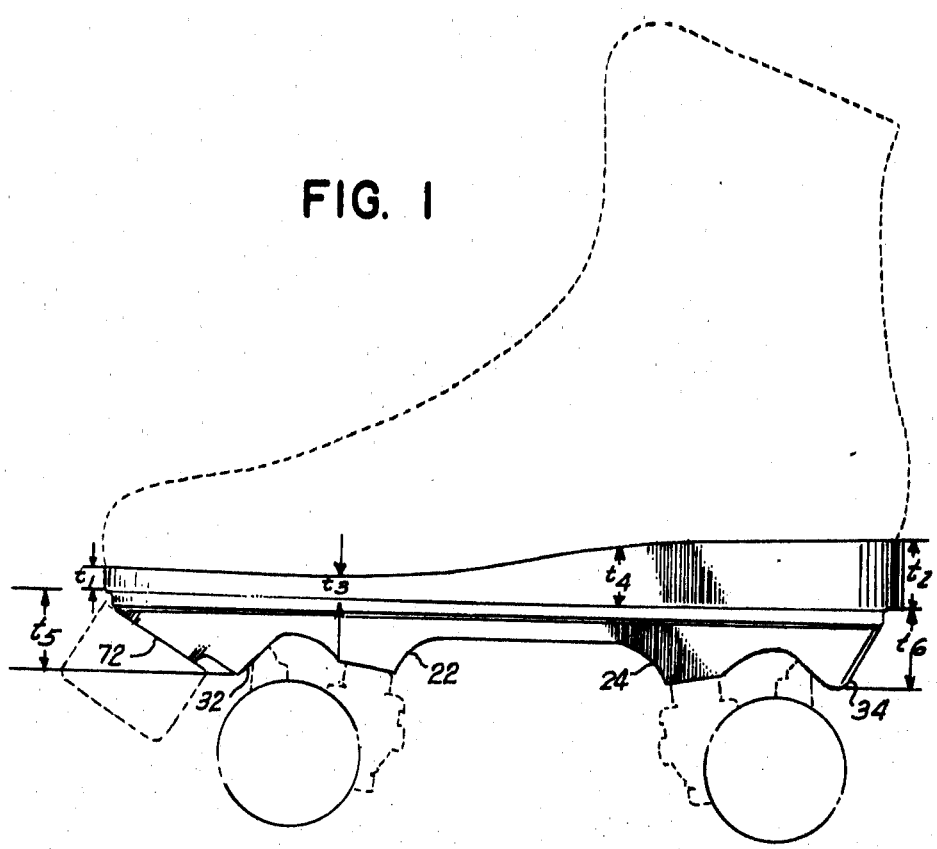
FIG. 1 is a side view of a roller skate showing in solid lines the injection molded sole in the form of a structural beam supporting roller skating wheels.
Figure 2:
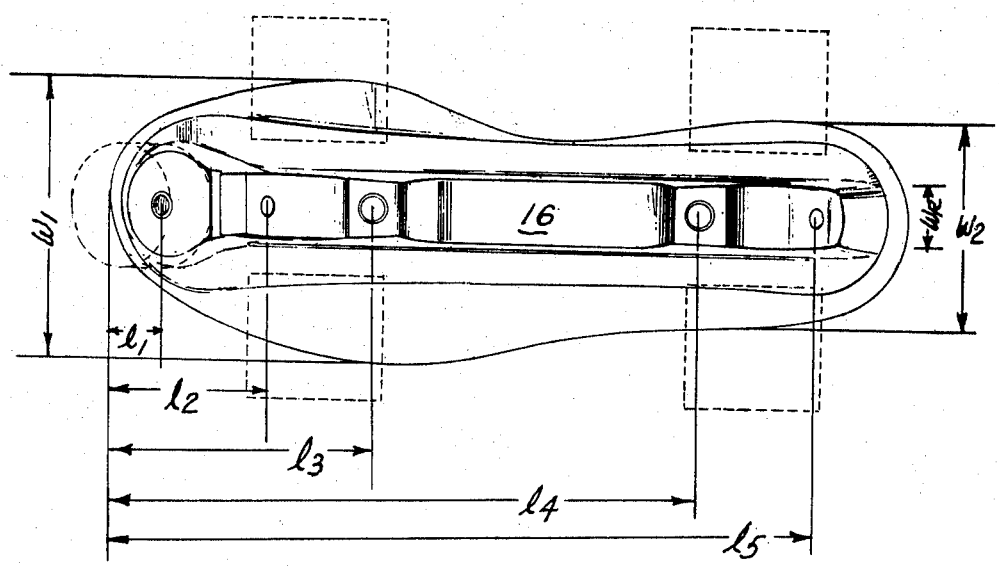
FIG. 2 is a bottom plan view of the structural beam sole.
Figure 3:
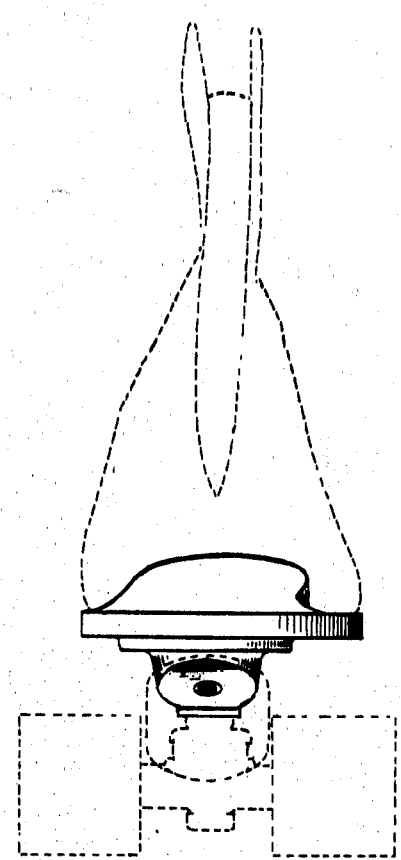
FIG. 3 and FIG. 4 are toe end and heel end views of the shoe of FIG. 1.
Figure 4:
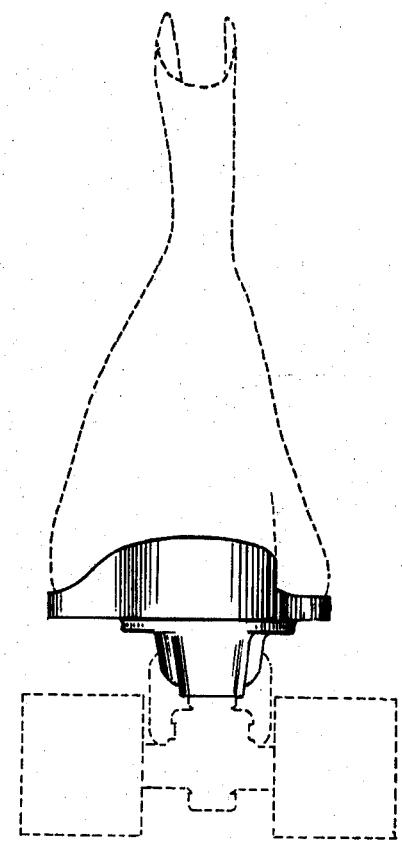
Figure 5:
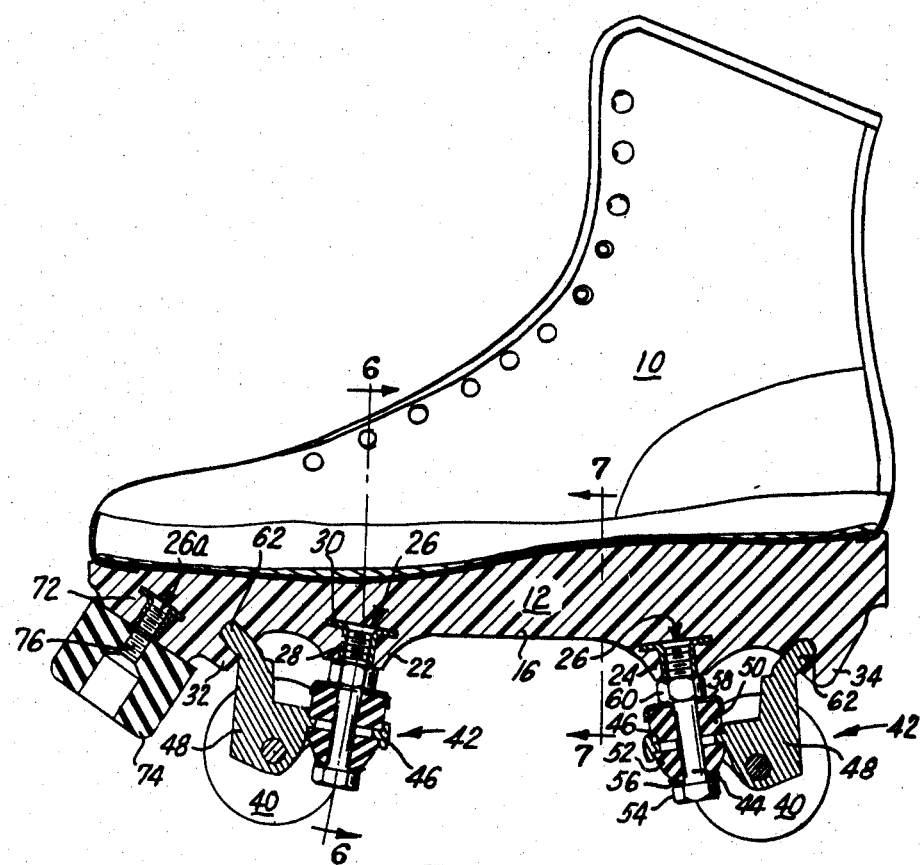
FIG. 5 is a side view, partially in cross section, of the roller skating shoe of FIG. 1.
Figure 6:
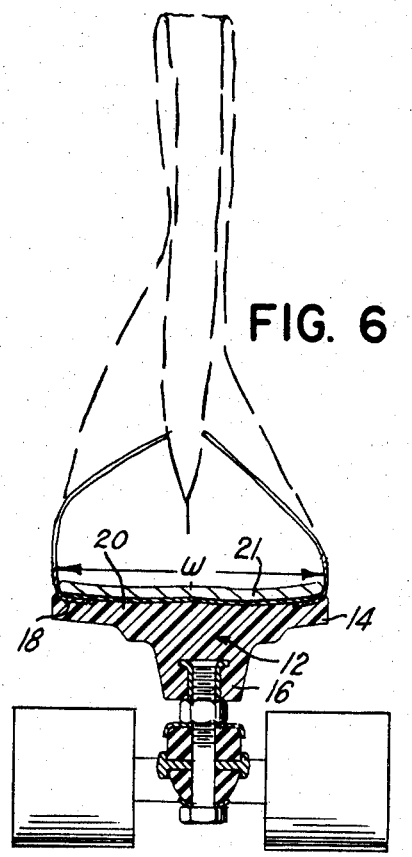
FIGS. 6 and 7 are cross sectional views taken on lines 6—6 and 7—7 respectively of FIG. 2.
Figure 7:
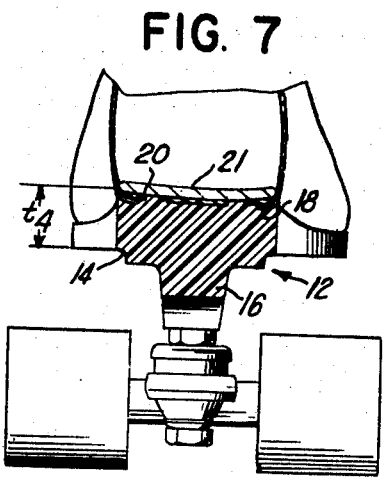

Referring to the figures, a string lasted upper 10 in the form of a roller skating boot is adhesively bonded by injection molding to a beam sole 12 having a T beam section profile as shown in FIGS. 6 and 7. The top flange 14 of the T profile extends the full width of the upper. The bottom, vertical leg or rib 16 of the T is narrower and extends longitudinally over the length of the boot. The entire T profile is a unitary molding. Upper edges of the flange of the T are injection molded directly to the string-lasted margins 18 of the upper, and inwardly thereof, to an insole 20. As shown in FIGS. 1 and 5 the lower edge of the vertical leg 16 of the injection molded sole is of irregular form. Main bosses 22 and 24, corresponding in position respectively to the ball of the foot and the forward portion of the heel, depend downwardly at a divergent angle. Embedded in the injection molded material in these bosses are threaded connectors 26 each comprising a tubular portion 28 (length ½", diameter ⅜") defining connecting threads and an enlarged upper portion 30, (outer diameter 1") serving to resist pull-out of the threaded connectors. A second set of apertured bosses 32 and 34 is provided, boss 32 being spaced forward of the boss 22 at the ball of the foot, and boss 34 is located below the rearward portion of the heel, these bosses extending downwardly at a convergent angle. Wheels 40 of the roller skates are mounted by typical hanger structures 42. Each structure comprises a bolt 44 extending through a metal ring 46 which is integral with bracing strut 48. The bolt 44 extends through rubber upper and lower cushion pads 50 and 52. The head 54 of the bolt bears against metal cap 56, lying against pad 52, and the upper side of the top pad 50 is similarly bounded by cap 58, compressed against separator 60 which lies against the respective boss. By threading bolt 44 into the threads of tubular section 28 of the receptacles the rubber pads 50 and 52 are compressed between end caps 56 and 58 and the hanger is joined to the injection molded beam sole. Strut 48 integral with each hanger has a strut end 62 slideably inserted in the aperture formed in bosses 32 and 34 respectively for the front and rear hanger units. A forwardmost boss 72 is provided in the toe region using a threaded receptacle 26a molded therein, this receptacle being a threaded connector similar in construction to threaded connectors 26. A resilient toe stop 74 is bolted to this boss by bolt 76. Advantageously the sole-defining top flange tapers in thickness from a normal sole thickness at the ball of the foot to a thickness of the order of one inch, to suitably raise the heel and the same time add greatly to the structural properties for properly joining the axles of the wheels. A typical roller skate shoe of 10½ inches length has the following approximate dimensions for use with typical truck assemblies:

- $t_1$ (thickness of sole at toe) $\frac{1}{4}$ inch
- $t_2$ (thickness of sole at heel) 1 inch
- $t_3$ (thickness of sole at ball) $\frac{1}{4}$ inch
- $t_4$ (thickness of sole at section 7) $\frac{3}{4}$ inch
- $t_5$ (maximum thickness of stiffening rib in toe region) $\frac{7}{8}$ inch
- $t_6$ (maximum thickness of stiffening rib in heel region) $\frac{7}{8}$ inch
- $w_1$ (maximum width of sole in front view) $3\frac{5}{8}$ inch
- $w_2$ (width of sole in rear view) $2\frac{3}{4}$ inch
- $w_r$ (width of stiffening rib) 1 inch lengths from tip of toe

- $l_1$ (toe stop bolt hole) $\frac{5}{8}$ inch
- $l_2$ (forward hanger strut hole) $2\frac{1}{8}$ inch
- $l_3$ (forward hanger bolt hole) $3\frac{5}{8}$ inch
- $l_4$ (rear hanger bolt hole) $7\frac{7}{8}$ inch
- $l_5$ (rear hanger strut hole) $9\frac{1}{2}$ inch According to the invention it is found that a semi-rigid plastic, suitable for defining a comfortable sole of a skating shoe or boot can also, by means of its beam-form profile, provide structural rigidity such that the previously required metal plate of prior shoe skates can be entirely dispensed with and roller skate carriages can be directly joined to this integral sole-beam unit.

The presently preferred molding material is a semi-rigid PVC of hardness on the Shore D scale of 55 and specific gravity 1.34. Such material may be obtained from Great American Chemical Company of Fitchburg, Massachusetts, product number 0355.

Process of Manufacture

Figure 8:
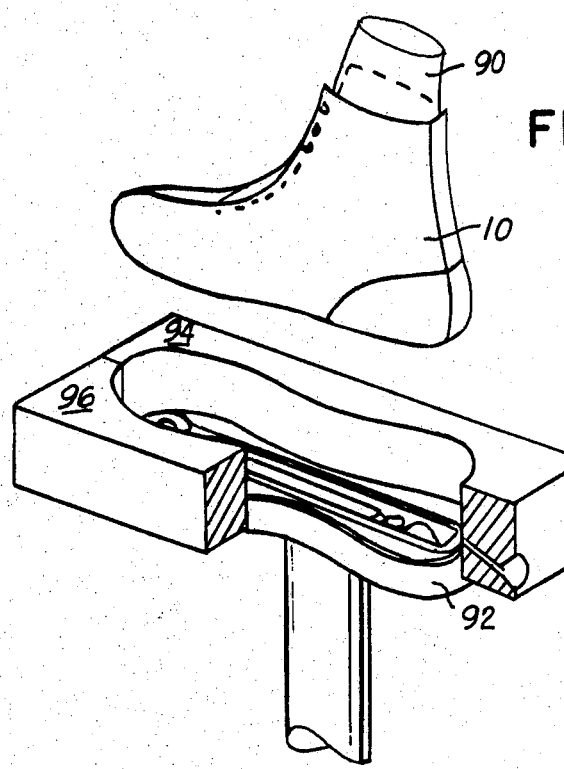
FIG. 8 is a diagrammatic view of an upper on a last before being brought into molding position for injection molding of the structural beam sole.
Figure 9:
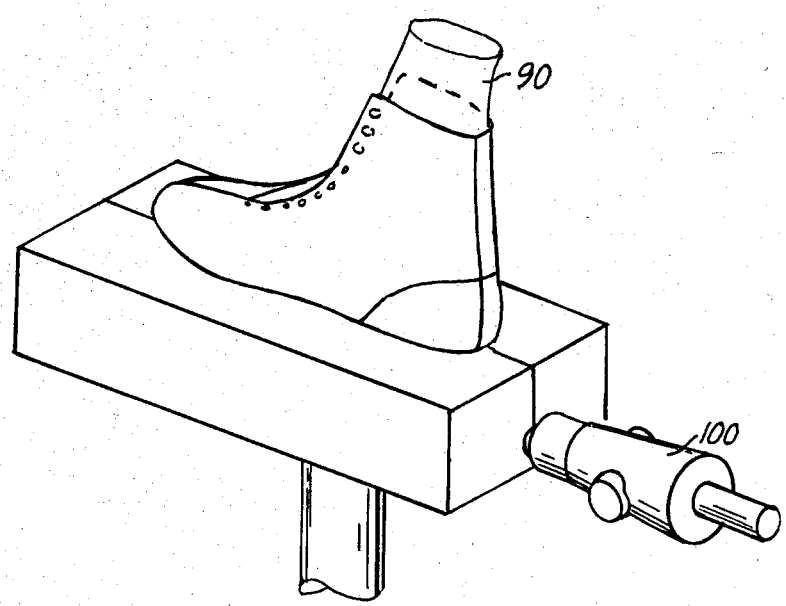
FIG. 9 is a view similar to FIG. 8 of the upper last in molding position.

In the process of manufacture the upper 10 is cut and sewn. By conventional string-lasting techniques it is then formed about a suitable last 90 and is placed in position over an injection molding mold. This mold comprises sole plate 92 and mold ring formed by ring halves 94 and 96. The upwardly facing surface of the sole plate 92 is specially formed to define the contour of the beam sole and the bosses that have been discussed. Also, prior to molding, threaded connectors 26, 26a are placed in position on pins in the sole plate, ready to be molded into the body of the injection molded sole. A fiber board insole 20 suggested by dotted line in FIG. 8 is also applied to the bottom of the lasted upper, held in position by a set of pins protruding from the last. Apertures in the insole permit plastic to flow through the insole against the last at spaced apart points in the arch region of the boot, see FIG. 7, to further anchor the insole.

With the insole 20 in place on the last, the last 90 with the upper 10 are lowered into the molding position shown in FIG. 8 and the hot, molten fluid plastic is injected by mechanism 100 into the mold to form the beam contour shown in the figures. After suitable cooling the mold parts are opened and the now-formed sole as shown in FIG. 1, bonded by injection molding to the upper 10, is withdrawn from the mold. Thereafter the hanger and wheel hardware as previously described are inserted into the receptacles and threaded into position and the toe stop is similarly secured into position. A sock liner 21 is applied over the insole to complete the shoe. The receptacles may vary in form, and under the broadest aspects of the invention may comprise through-bolt holes, formed by pins in the mold, and the hangers can be joined by through-bolts extending to recesses below the insole.

The resulting shoe construction and method permit a high quality skating shoe to be provided having many new and advantageous features. The steel plate can be omitted. A shoe or boot of almost any style can be employed. The injection molding of the sole and beam permit stylish selection by suitable coloring agents of the sole material. And the overall unit can be lighter in weight and less expensive to make.

What is claimed is:

1. A roller skating shoe comprising
   an integral sole-chassis unit injection molded from semi-rigid plastic material,
   an upper which is in-situ bonded to said sole-chassis unit during molding thereof,
   front and rear threaded connecting means,
       each said threaded connecting means being permanently embedded within the interior of said injection-molded sole-chassis unit during molding thereof,
       each said connecting means including one or more transversely extending portions embedded within said sole-chassis unit for resisting pull out and other forces on said connector means,
   front and rear skate wheel hangers connected to and retained by said threaded connector means,
       each of said hangers also including a strut element forming a second connection between said hanger and said sole-chassis unit, and
   roller skate wheels rotatably mounted on said hangers,
       said sole-chassis unit providing a substantial mass of semi-rigid plastic material in the region of said front and rear hangers for structurally supporting said hangers.

2. The roller skating shoe of claim 1 wherein said threaded connecting means includes tubular portions defining the threads and upper enlarged portions defining said transversely extending portions.

3. The roller skating shoe of claim 1 or 2 wherein said sole is of structural beam profile, the foot-supporting portion comprising the upper flange thereof.

4. The roller skating shoe of claim 1 or 2 wherein said injection molded sole in transverse cross section is of integral T profile, the upper flange of the T defining the foot supporting portion extending over the width of the shoe, and the lower vertical portion defining a relatively narrow longitudinal structural rib in which said receptacles are molded.

5. The roller skating shoe of claim 1 or 2 wherein said upper is a string-lasted upper and the injection molded sole containing said receptacles is bonded directly to the margins of said string-lasted upper.

6. The roller skating shoe of claim 5 including an insole against which said injection molded sole is formed.

7. The roller skating shoe of claim 1 or 2 wherein the bottom of said sole is of irregular contour defining a spaced apart pair of first bosses, receptacles molded into the sole material within said bosses for permanent joining said hangers to said sole, a pair of second bosses, one spaced forward of the forward first boss and one spaced rearward of the rearward first boss, said second bosses having receptacles slideably receiving bracing struts of said hangers.

8. The roller skating shoe of claim 7 wherein said sole includes a third forwardmost boss mounting a toe stop.

9. The roller skating shoe of claim 7 wherein one of said first pair of bosses is located at the ball region of the foot and the other of said pair is located in the region of the forward part of the heel, said bosses extending downwardly at a divergent angle.

10. The roller skating shoe of claim 7 wherein said bosses are integral formations of an injection molded lower, central structural rib extending the length of the shoe, said rib being an integral part of the injection molded sole.

* * * * *